US010633208B2

(12) United States Patent
Marshall et al.

(10) Patent No.: US 10,633,208 B2
(45) Date of Patent: Apr. 28, 2020

(54) OUTPUT HOPPER FOR MEDIA PROCESSING DEVICES

(71) Applicant: Zebra Technologies Corporation, Lincolnshire, IL (US)

(72) Inventors: Graham Marshall, Shoreham, NY (US); Konstantinos Tsiopanos, Selden, NY (US); Thomas R. Helma, Wakefield, RI (US); Noel R. Bankston, Flushing, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/807,043

(22) Filed: Nov. 8, 2017

(65) Prior Publication Data

US 2019/0135569 A1 May 9, 2019

(51) Int. Cl.
*B65H 31/02* (2006.01)
*B65H 1/06* (2006.01)
(Continued)

(52) U.S. Cl.
CPC .............. *B65H 31/02* (2013.01); *B41J 3/407* (2013.01); *B41J 11/58* (2013.01); *B41J 13/12* (2013.01); *B65H 1/06* (2013.01); *B65H 3/063* (2013.01); *B65H 7/06* (2013.01); *B65H 31/24* (2013.01); *B65H 31/30* (2013.01); *B65H 43/04* (2013.01); *B65H 43/06* (2013.01); *G06K 1/121* (2013.01); *G06K 13/14* (2013.01); *B65H 2301/4212* (2013.01); *B65H 2402/41* (2013.01);
(Continued)

(58) Field of Classification Search
USPC ........................................ 414/790.3; 198/430
See application file for complete search history.

(56) References Cited

U.S. PATENT DOCUMENTS 1,515,986 A   11/1924 Wright et al.
3,636,316 A   1/1972 Suzuki et al.
(Continued)

FOREIGN PATENT DOCUMENTS

EP   385417 A2   9/1990
EP   623894 A1   11/1994
(Continued)

OTHER PUBLICATIONS

NBS Technologies Card Printer, Javelin DNA, User guide manual, retrieved from the Internet on Oct. 30, 2017 at <http://www.nbstech.co.uk/downloads/manuals/Javelin_DNA_series_userguide.pdf>.
(Continued)

*Primary Examiner* — Thomas A Morrison

(57) ABSTRACT

An example disclosed output hopper includes a cavity to receive media units from an output of a media processing device, the cavity to cause the media units to form a stack in a first direction; a first door pivotably movable between a closed position and an open position, the first door to retain the media units in the cavity when in the closed position; a second door movable between the closed position and the open position, the second door to retain the media units in the cavity when in the closed position; wherein the first door is configured to pivot on a first axis substantially parallel to the first direction; and the second door is configured to pivot on a second axis substantially parallel to the first direction.

19 Claims, 10 Drawing Sheets

(51) Int. Cl.

| | | |
|---|---|---|
| *B65H 7/06* | (2006.01) | |
| *G06K 1/12* | (2006.01) | |
| *B41J 11/58* | (2006.01) | |
| *B41J 3/407* | (2006.01) | |
| *B65H 43/06* | (2006.01) | |
| *B65H 31/24* | (2006.01) | |
| *B41J 13/12* | (2006.01) | |
| *B65H 31/30* | (2006.01) | |
| *B65H 43/04* | (2006.01) | |
| *G06K 13/14* | (2006.01) | |
| *B65H 3/06* | (2006.01) | |

(52) U.S. Cl.
CPC .... *B65H 2402/46* (2013.01); *B65H 2403/942* (2013.01); *B65H 2404/1421* (2013.01); *B65H 2405/1124* (2013.01); *B65H 2405/11152* (2013.01); *B65H 2405/3321* (2013.01); *B65H 2601/271* (2013.01); *B65H 2601/325* (2013.01); *B65H 2701/1914* (2013.01); *B65H 2801/12* (2013.01)

(56) References Cited

U.S. PATENT DOCUMENTS

| | | | |
|---|---|---|---|
| 4,281,244 A | | 7/1981 | Murata et al. |
| 4,971,310 A | | 11/1990 | Vlotegi et al. |
| 5,061,022 A | * | 10/1991 | Meriwether .............. E05C 7/04 |
| | | | 292/33 |
| 5,768,143 A | | 6/1998 | Fujimoto |
| 6,600,167 B2 | | 7/2003 | Sano |
| D527,044 S | | 8/2006 | Harden et al. |
| 7,328,897 B2 | | 2/2008 | Bryant et al. |
| 7,416,179 B2 | | 8/2008 | Jones et al. |
| 7,433,614 B2 | | 10/2008 | Suzuki |
| 8,387,975 B2 | | 3/2013 | Suzuki |
| 2003/0090052 A1 | | 5/2003 | Hsiao et al. |
| 2004/0109715 A1 | | 6/2004 | Meier et al. |
| 2005/0078973 A1 | | 4/2005 | Suzuki |
| 2005/0242488 A1 | | 11/2005 | Pelletier et al. |
| 2006/0091331 A1 | | 5/2006 | Tanamachi |
| 2007/0228647 A1 | | 10/2007 | Hara |
| 2010/0289845 A1 | | 11/2010 | Conway et al. |
| 2011/0049788 A1 | | 3/2011 | Suzuki et al. |
| 2011/0056415 A1 | | 3/2011 | Moog et al. |
| 2011/0123307 A1 | | 5/2011 | Pillard |
| 2011/0217109 A1 | | 9/2011 | Cronin et al. |
| 2012/0181741 A1 | | 7/2012 | Suzuki |
| 2012/0181744 A1 | | 7/2012 | Suzuki |
| 2013/0140759 A1 | | 6/2013 | Kuo |
| 2013/0334771 A1 | * | 12/2013 | Igarashi ................ B65H 31/24 |
| | | | 271/288 |
| 2014/0374986 A1 | | 12/2014 | Takada |
| 2015/0028532 A1 | | 1/2015 | Takahashi |
| 2016/0229207 A1 | | 8/2016 | Perry et al. |

FOREIGN PATENT DOCUMENTS

| | | | |
|---|---|---|---|
| EP | 1510484 A1 | | 3/2005 |
| JP | 2005-84439 | * | 3/2005 |
| WO | 2009/136129 A1 | | 11/2009 |

OTHER PUBLICATIONS

User Guide, Evolis, Primacy, retrieved from the Internet on Oct. 30, 2017 at <https://us.evolis.com/sites/default/files/atoms/files/primacy_userguide_ku_prm1-037-eng-c0_0.pdf>.
Zebra P630i/P640i Card Printer User's Manual, Manual, 2006, pp. 8, 26-28, 980541-003 Rev. A, ZIH Corp.
Zebra P330i/330M Card Printer User's Manual, Manual, 2004/2005, pp. 26 and 27, 980459-001 Rev. C, ZIH Corp.
Printing and Encoding Solutions, Fargo HDP8500 Industrial Card Printer/Encoder, Brochure, 2014, p. 3, Fargo.
Polaroid XPS Card Printer, Installation and User Guide, Jun. 2011, entire document, Part No. 539957-020 Rev. A.
Evolis Tattoo 2: User's Guide, Sep. 2007, entire document, Evolis Card Printer.
International Search Report and Written Opinion for International Patent Application No. PCT/US2016/017996 dated Jun. 1, 2016.
U.S. Appl. No. 15/644,017, filed Jul. 7, 2017.
U.S. Appl. No. 15/644,048, filed Jul. 7, 2017.
U.S. Appl. No. 14/670,961, filed Mar. 27, 2015.
U.S. Appl. No. 29/609,961, filed Jul. 7, 2017.
U.S. Appl. No. 15/951,817, filed Apr. 12, 2018.
U.S. Appl. No. 15/643,966, filed Jul. 7, 2017.
U.S. Appl. No. 15/643,925, filed Jul. 7, 2017.
U.S. Appl. No. 29/606,497, filed Jun. 5, 2017.

* cited by examiner

OUTPUT HOPPER FOR MEDIA PROCESSING DEVICES

BACKGROUND

Some media processing devices are configured to process media units, such as identity cards (e.g., driver's licenses or employee badges). As used herein, the term "media unit" refers to a discrete media unit. While some examples disclosed herein are described using the term "card," a card is an example type of media unit and example methods and apparatus disclosed herein are applicable to any suitable type of media unit(s).

A media processing device processes a media unit by, for example, printing indicia onto one or more surfaces of the media unit and/or encoding the media unit with machine-readable data. After the media unit is processed, the media processing device dispenses the media unit in a manner that makes the processed media unit accessible to a user. For example, the media processing device dispenses the media unit into a cavity configured to receive and retain a plurality of media units. The cavity is defined by a structure referred to as an output hopper.

DETAILED DESCRIPTION

Figure 1:
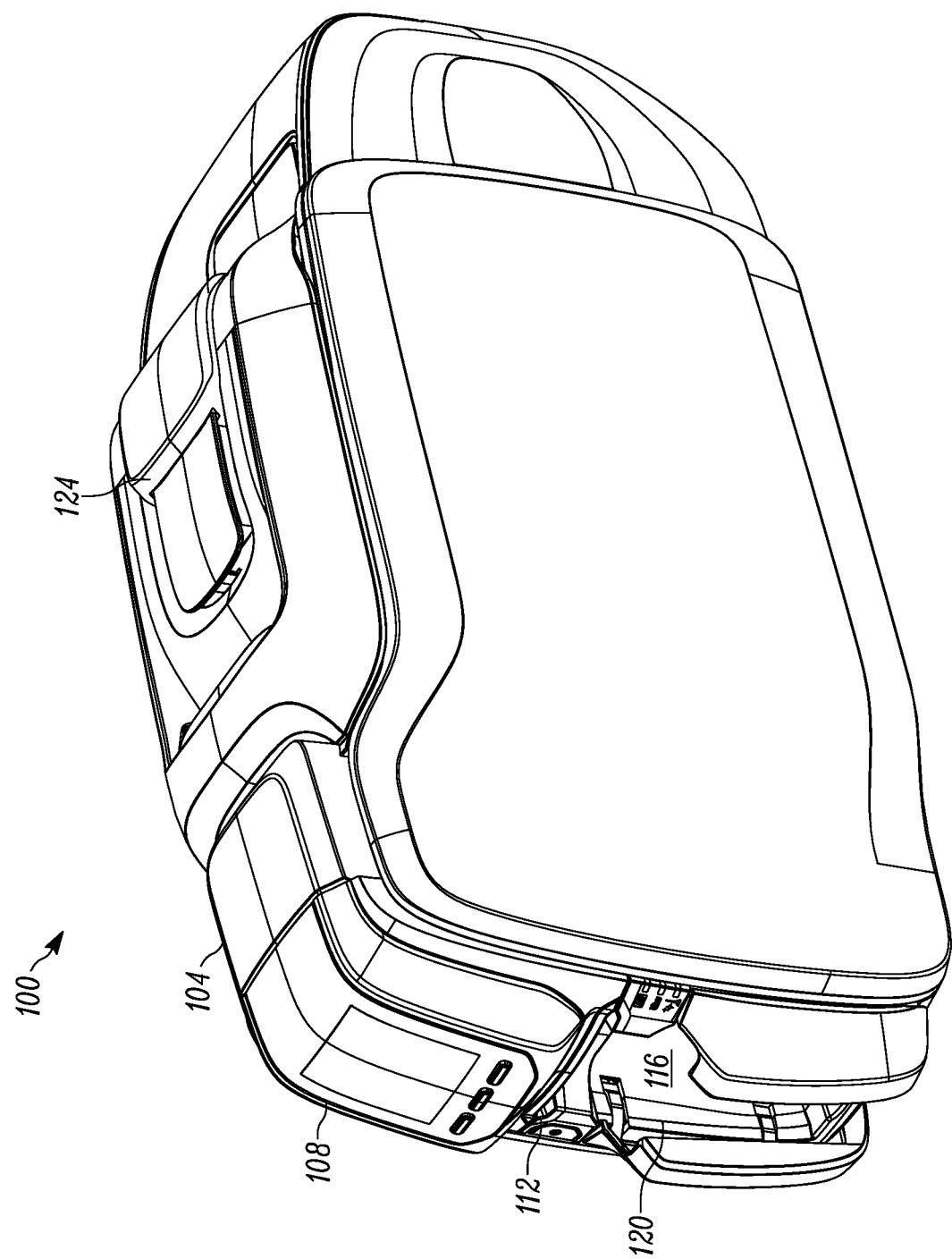
FIG. 1A depicts an example media processing device having an output hopper constructed in accordance with teachings of this disclosure.
Figure 2:
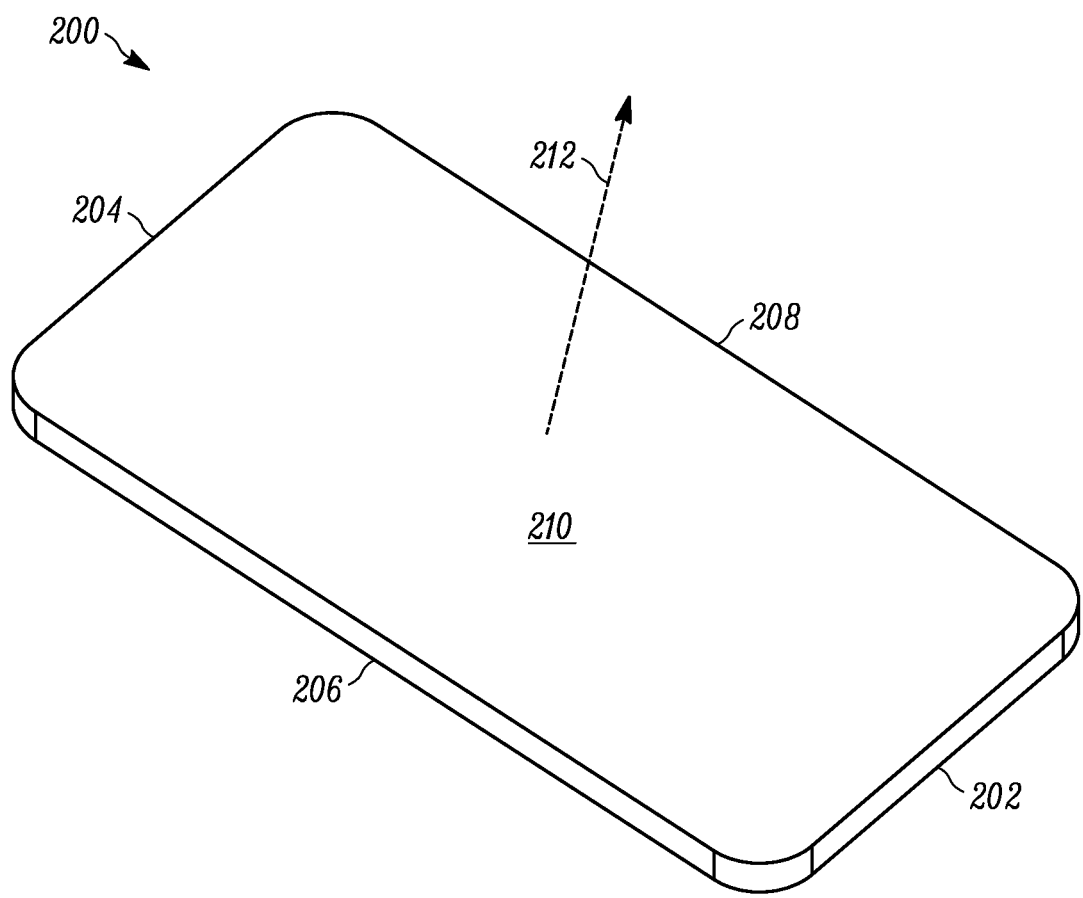
FIG. 2 depicts an example media unit to be processed by the example media processing device of FIG. 1.

FIG. 1 depicts an example media processing device 100 constructed in accordance with the teachings of this disclosure. The example media processing device 100 is configured to process media units, such as cards (e.g., identity cards). An example media unit 200 to be processed by the example media processing device 100 is shown in FIG. 2. The example media unit 200 includes a first minor edge 202, a second minor edge 204, a first major edge 206, and a second major edge 208. The minor edges 202 and 204 are shorter in length than the major edges 206 and 208. The example media unit 200 includes a first surface 210 and a second surface (not shown in FIG. 2) opposing the first surface 210. The example media unit 200 has a thickness between the first surface 210 and the second surface. In the illustrated example, the first surface 210 defines a plane referred to herein as the "media unit plane." While the first surface 210 is used to refer to the "media unit plane" herein, the second surface may be used to refer to the "media unit plane." An example normal 212 extending from the first surface 210 is shown in FIG. 2. Put another way, the example normal 212 of FIG. 2 extends perpendicularly away from the media unit plane. As media units are stacked on top of each other, the stack forms along the example normal 212.

Referring back to FIG. 1, the media processing device 100 includes a housing 104 defined by a plurality of panels. The media processing device 100 stores a supply of unprocessed media units in an input hopper. In this example, the input hopper is a user-accessible cavity positioned within the housing 104. The input hopper of FIG. 1 is accessible from the exterior of the media processing device 100 via an input hopper door 108. The supply of media units is placed in the input hopper by opening the input hopper door 108 and inserting the media units into the exposed cavity. The example media processing device 100 of FIG. 1 includes an auxiliary input slot 112 for insertion of a single media unit into the input hopper.

The media processing device 100 of FIG. 1 moves a media unit from the input hopper to processing elements, which process the media unit by, for example, generating indicia on one or more surfaces of the media unit. The processing of the media unit is described in detail below in connection with FIG. 3. The indicia applied to the media unit are sourced from a cassette (e.g. a ribbon cassette) supported within the housing 104. The cassette is accessible from the exterior of the media processing device 100 via a cassette access door 124.

In some examples, when an issue with a media unit and/or the processing thereof, the media unit is rejected. In this example, rejected media units are routed to a reject area proximate to an interior surface of the cassette access door 124. The reject area is described in detail below in connection with FIG. 3.

If the media unit is processed without issue, the media processing device 100 dispenses the media unit into a processed media output. In this example, the processed media output is an output hopper 116, which provides users access to the processed media units via an output opening 120. The example output hopper 116 of FIG. 1, which is described in detail below, is constructed in accordance with teachings of this disclosure. Notably, the output hopper 116, which is associated with processed media (i.e., non-rejected cards) is separate from the reject area proximate to the interior surface of the cassette access door 124.

Figure 3:
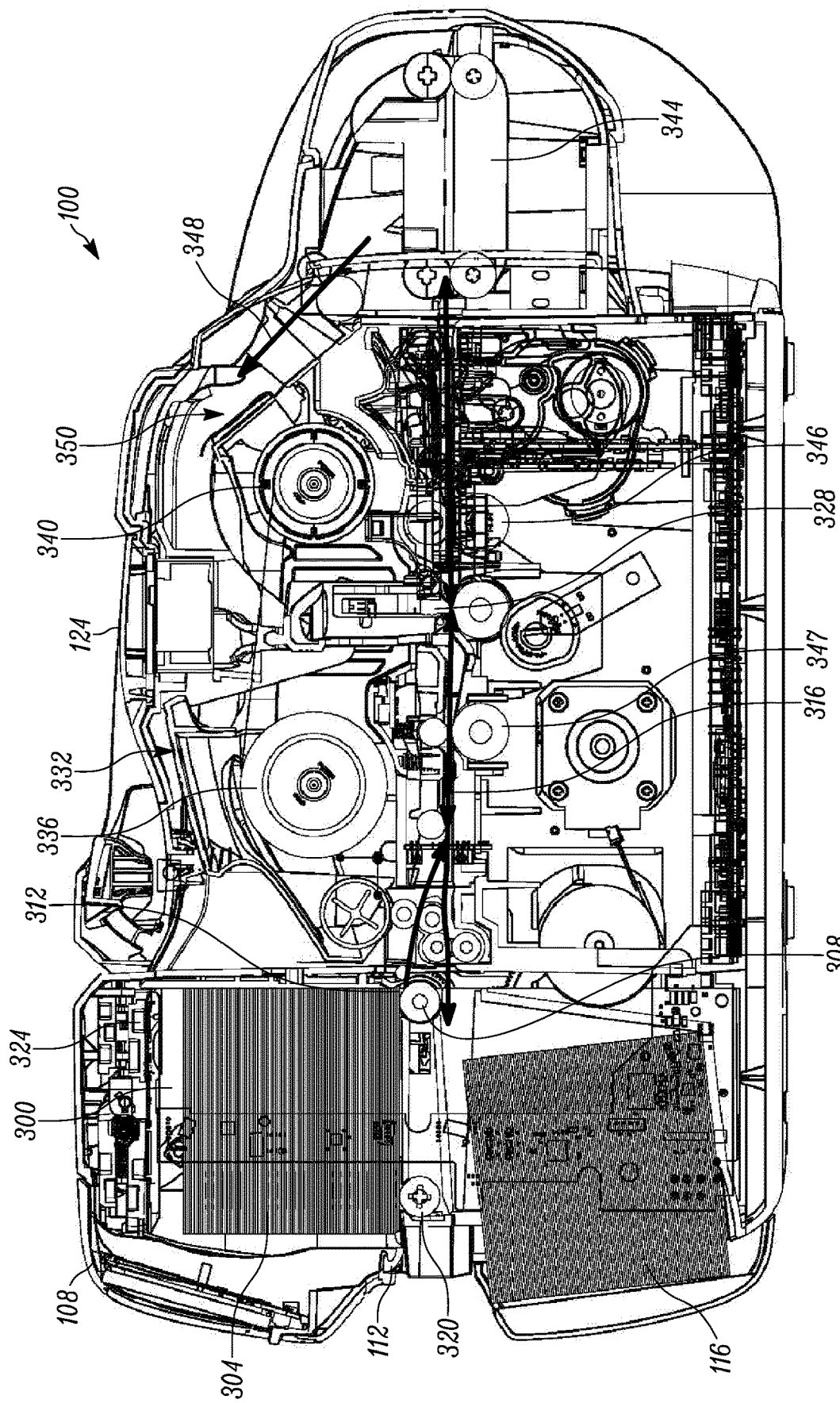
FIG. 3 depicts a cross-sectional view of the example media processing device of FIG. 1.

Turning to FIG. 3, a cross-sectional view of the example media processing device 100 of FIG. 1 is depicted. As seen in FIG. 3, the media processing device 100 includes, within the housing 104, an unprocessed media input in the form of an input hopper 300. The input hopper 300 is configured to store a plurality of media units 200, such as identity cards, in a stack 304. The input hopper 300 of FIG. 3 can store media units of a variety of thicknesses. In the illustrated example, the input hopper 300 is loaded media units 200 having a thickness of between about 0.2 mm and about 1 mm. Typically, the entire supply of media units in the input hopper 300 at given time have the same thickness. However, in some examples the media processing device 100 is also configured to process media units having different thicknesses.

A pick roller 308 is disposed at an outlet 312 of the input hopper 300, and is configured to dispense a single media unit 200 from the input hopper 300 to a media transport assembly configured to guide the media unit 200 along a media processing path 316. The media processing device 100 also includes an input roller 320 at the slot 112, configured to drive a single media unit 200 fed into the slot 112 underneath the stack 304 already present (if any) in the input hopper. The single media unit 200 fed into the slot 112 is then dispensed from the input hopper 300 for travel along the media processing path 316. In other words, the media processing device 100 is configured to process media units 200 retrieved from the stack 304 in the input hopper 300, as well as single-feed media units 200 received via the input slot 112.

The input hopper 300 also contains a biasing assembly 324 disposed above the media unit stack 304. The pick roller 308 dispenses the bottom media unit 200 from the stack 304 by frictionally engaging with the bottom media unit 200. If insufficient force is exerted by the bottom media unit 200 on the pick roller 308, the frictional engagement between the pick roller 308 and the media unit 200 may be too weak for the pick roller 308 to dispense the media unit 200. When the input hopper 300 is full, the weight of the media unit stack 304 alone may apply sufficient force for engagement between the bottom media unit 200 and the pick roller 308. The biasing assembly 324 is configured to apply a progressively greater force to the top of the stack 304 as the stack 304 shrinks in size, thus maintaining a substantially constant force on the bottom media unit 200. The biasing assembly 324, in the present example, is implemented as a Sarrus linkage biased towards an open position in which the biasing assembly 324 applies a force on the media unit stack 304 (the linkage is shown in a closed, or retracted, position in FIG. 3) by one or more biasing elements, such as a combination of coil springs.

The media transport assembly includes a plurality of rollers and guide surfaces. The media processing path 316, as seen in FIG. 3, extends from the input hopper 300 to a processing head 328, such as a printhead configured to facilitate generation of indicia to the media unit 200 by transferring ink from an ink ribbon to the media unit 200. In this example, the media processing device 100 is a thermal transfer printer, and the printhead 328 is supplied with an ink ribbon from a cassette 332 removably supported within the housing 104. The housing 104 includes an opening (not shown in FIG. 3) permitting access to the cassette 332. The above-mentioned cassette access door 124 has a closed position (shown in FIG. 3) for obstructing the opening to prevent access to the cassette 332, and an open position for permitting placement and removal of the cassette 332 into and out of the media processing device 100.

During printing operations, the ink ribbon (not shown) travels from a supply roller 336 of the cassette 332 to the printhead 328, and then to a take-up roller 340 of the cassette 332. As the ink ribbon and the media unit 200 pass the printhead 328, the ink ribbon is in contact with the media unit 200. To generate the above-mentioned indicia, certain elements (e.g., printhead dots) of the printhead 328 are selectively energized (e.g., heated) according to machine-readable instructions (e.g., print line data or a bitmap). When energized, the elements of the printhead 328 apply energy (e.g., heat) to the ink ribbon to transfer ink to specific portions of the media unit 200.

In some examples, processing of the media unit 200 includes encoding data in an integrated circuit, such as a radio frequency identification (RFID) tag, magnetic strip, or combination thereof, embedded in the media unit 200. Encoding may occur at a location of the printhead 328 mentioned above, or at a distinct secondary processing element upstream or downstream of the printhead 328 along the media processing path 316.

Having traversed the printhead 328, the media unit 200 is transported to a media unit redirector 344 controllable to reverse, or flip, the media unit 200 by receiving the media unit 200, rotating by about 180 degrees, and expelling the media unit 200. In the illustrated example, the redirector 344 is configured to perform the above functions (receiving, flipping, and expelling a media unit 304) under motive power supplied by a single source, such as a motor.

Accordingly, the media transport assembly is configured to operate in two opposite directions along at least a portion of the media processing path 316 (illustrated in double lines). Specifically, the media processing path 316 proceeds in a return direction (as opposed to an outbound direction from the input hopper 300 to the printhead 328 and the redirector 344, described above) from the redirector 344 to the printhead 328. As a result of the media unit 200 having been flipped at the redirector 344, on the return pass of the printhead 328 an opposite side of the media unit 200 is exposed to the printhead 328 than on the outbound pass of the printhead 328. The media processing device 100, in other words, is capable of applying indicia to both sides of the media unit 200, before the media unit 200 is transported along the remainder of the media processing path 316 to the output hopper 116.

Prior to entering the redirector 344, the media unit 200 is transported by drive rollers 346 and 347 of the above-mentioned transport assembly, to traverse one or more registration assemblies. At least one of the registration assemblies is configured to align the media unit 200 with the direction of travel along the media processing path 316 before the media unit 200 enters the redirector 344. In some examples, the registration assembly is configured to retract away from the media processing path 316 as the media unit 200 exits the redirector 344 in the return direction.

The media unit 304 travelling along the media processing path 316 may alternatively be redirected from the media processing path 316 to an auxiliary processing path 348, also referred to as a media reject path. In the illustrated example, the redirector 344 is controllable, for example responsive to a detection of misaligned indicia applied at the printhead 328, a failed data writing operation to an embedded circuit in the media unit 200 or other defect, to rotate to a reject position at an angle other than 180 degrees from the resting position shown in FIG. 3. Having rotated to the reject position, the redirector 344 is configured to expel the media unit 200, which is transported along the reject path 348 to a media unit holder 350 that defines a storage area for rejected media units.

As indicated above, when the media unit 200 is properly processed (i.e., not rejected), the media unit 200 proceeds along the media processing path 316 in the return direction toward the output hopper 116. FIG. 3 illustrates a stack of media units that forms in the output hopper 116 when multiple media units enter the output hopper 116.

Figure 4:
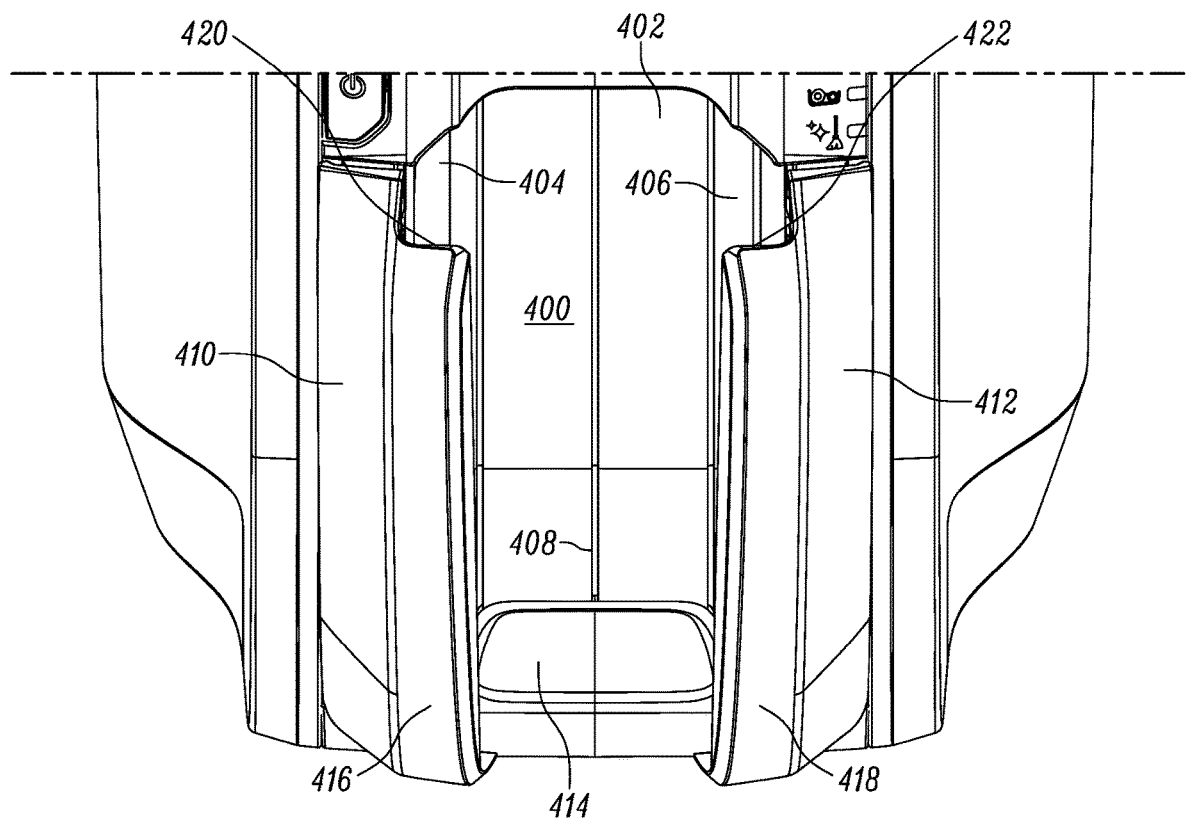
FIG. 4 is a front view of the output hopper.

FIG. 4 is a front view of the output hopper 116. The output hopper 116 includes surfaces that define a cavity 400 configured to receive the media unit 200 in a particular orientation. In the illustrated example, the cavity 400 is defined by a rear surface 402, first and second side surfaces 404 and 406 (FIG. 5), a bottom surface 408, and first and second doors 410 and 412. The first minor edge 202 of the media unit 200 enters the output hopper 116 before the second minor edge 204. That is, the media unit 200 falls into the cavity 400 with the first minor edge 202 leading the second minor edge 204. As such, when the media unit 200 falls into the cavity 400, the first minor edge 202 of the media is located proximate (e.g., abutting) the first and second doors 410 and 412, the second minor edge 204 is located proximate the rear surface 402, the first major edge 206 is located proximate the first side surface 404, and the second major edge 208 is located proximate the second side surface 406. Put another way, when the media unit 200 comes to a rest in the cavity 400, the second minor edge 204 extends along the rear surface 402 from the first side surface 404 to the second side surface 406. Further, when the media unit 200 comes to a rest in the cavity 400, the first and second major edges 206 and 208 extend along the first and second side surfaces 404 and 406, respectively, from the rear surface 402 towards the first and second doors 410 and 412, respectively.

In the illustrated example, a front portion of the bottom surface 408 slopes downwards in a direction away from the rear surface 402. Additionally, the bottom surface 408 includes a recess (e.g., bowl-shaped surface) 414 to enable a user to place, for example, a finger or thumb underneath a bottommost media unit in the cavity 400 to remove the media unit(s). Removal of the media unit(s) and the recess 414 are discussed in further detail below.

As the media units 304 fall into the output hopper 116, a stack of media units forms in a direction normal to the media unit plane. That is, the stack forms in a direction corresponding to the normal 212 that extends from the first surface 210 described above in connection with FIG. 2. Put yet another away, the stack of media units in the cavity 400 forms in a direction extending away from the bottom surface 408 and toward a ceiling of the output hopper 116.

As shown in FIG. 4, the first door 410 and the second door 412 are in a closed position. In the closed position, the first and second doors 410 and 412 retain media units located in the cavity 400. In particular, the first door 410 includes a first retaining portion 416, and the second door 412 includes a second retaining portion 418. Each of the retaining portions 416 and 418 includes a face configured to engage a portion of the first minor edge 202 of the media unit(s) 200 located in the cavity 400 when the doors 410 and 412 are in the closed position. A channel or space separates the first retaining portion 416 of the first door 410 from the second retaining portion 418 of the second door 412. Due to the channel, a middle portion of the first minor edge 202 is not engaged by the first and second retaining portions 416 and 418. That is, a portion of the media unit(s) located in the cavity 400 is accessible to users through the channel even when the first and second doors 410 and 412 are in the closed position. When the first and second doors 410 and 412 are in the closed position the channel therebetween is smaller than a length of the first minor edge 202 of the media unit 200 and, thus, the media unit 200 is retained in the cavity 400 by the first and second retaining portions 416 and 418 of the first and second doors 410 and 412.

The first door 410 includes a first cutout 420 at a top edge and the second door 412 includes a second cutout 422 at a top edge. The first and second cutouts 420 and 422 provide space between uppermost edges of the retaining portions 416 and 418, respectively, and a top of the cavity 400. As discussed below in connection with FIG. 9, the space provided by the first and second cutouts 420 and 422 provide a method of removing one or more media units 200 from the cavity 400. That is, a user can slide the media unit(s) upwards in the cavity 400 until reaching the space formed by the cutouts 420 and 422, and then pull the media unit(s) out of the cavity 400, all without moving the first and second doors 410 and 412. Moreover, as discussed further in connection with FIG. 10 below, the first and second cutouts 420 and 422 allow media units to spill out of the cavity 400 in the event that a capacity of the output hopper 116 is exceeded, thereby preventing, for example, jamming of the media processing device 100.

Figure 5:
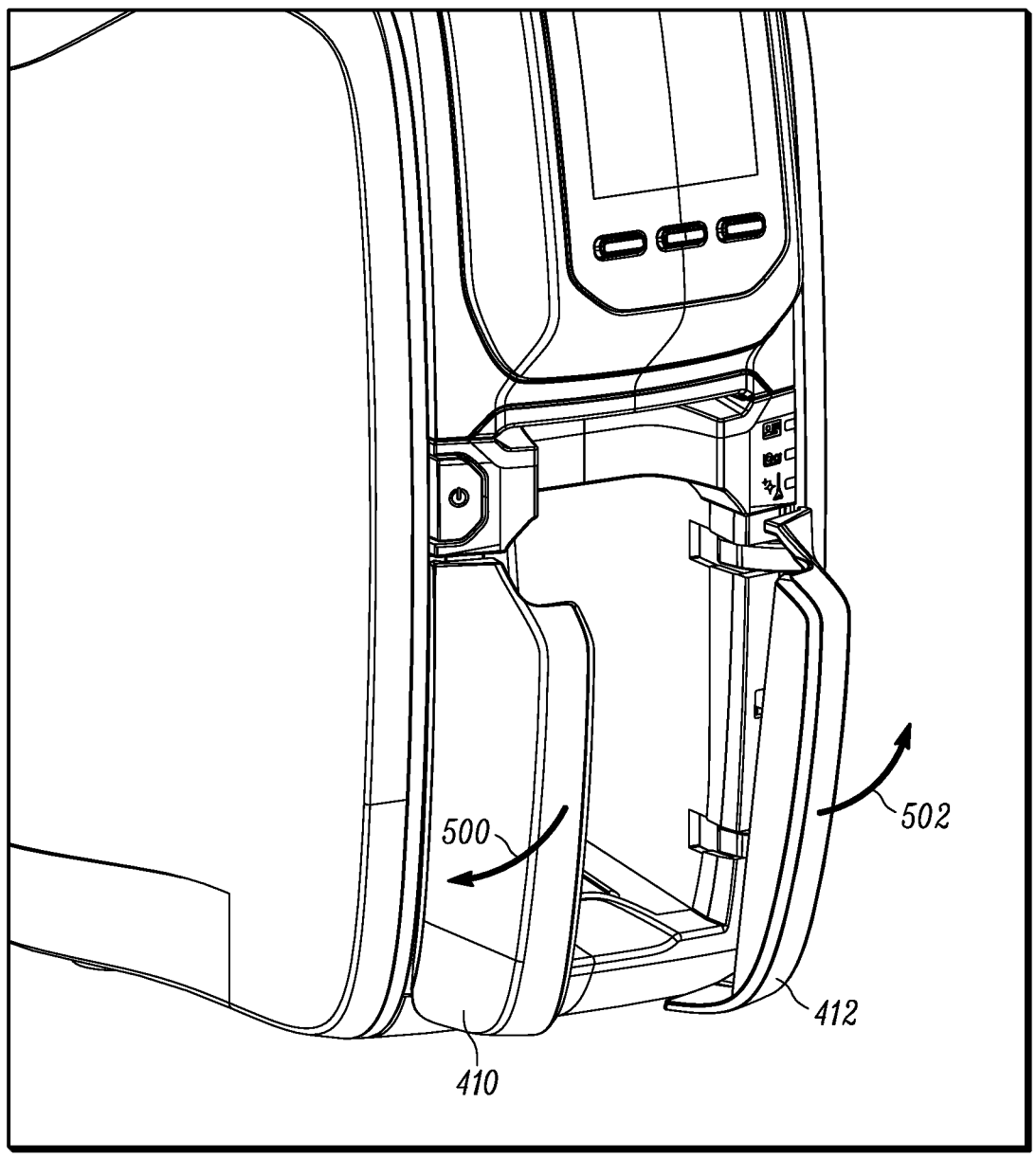
FIG. 5 depicts the output hopper in a closed position.

FIG. 5 illustrates a first rotational direction 500 in which the first door 410 moves from the closed position to an open position. Additionally, FIG. 5 illustrates a second rotational direction 502 in which the second door 412 moves from the closed position to the open position. The first door 410 is pivotably mounted to a first side of the housing 104, and the second door 412 is pivotably mounted to a second side of the housing 104. In the illustrated example, each of the first and second doors 410 and 412 is pivotably mounted at a plurality of locations along the first and second sides of the housing 104. The mounting of the first and second doors 410 and 412 is discussed further below in connection with FIG. 6.

To move the first door 410 in the first rotational direction 500, a user applies a force to the first door 410. To move the second door 412 in the second rotational direction 502, the user applies a force to the second door 412. Notably, the first door 410 is independently movable from the second door 412 and vice versa. For example, the first door 410 may pivot in the first rotational direction 500 while the second door 412 remains still. Further, the second door 412 may pivot in the second rotational direction 502 while the first door 410 remains still. Further, the first and second doors 410 and 412 can both move simultaneously.

In the illustrated example, the first and second doors 410 and 412 are biased to the closed position and, thus, the applied force needed to move the first and second doors 410 and 412 is great enough to overcome the biasing of the first and second doors 410 and 412. The force can be applied directly (e.g., via a finger in contact with the first door 410). Additionally or alternatively, the force can be applied indirectly by, for example, pulling on one or more media units positioned in the cavity 400, thereby causing the one or more media units to force the first door 410 to move in the first rotational direction 500 and the second door 412 to move in the second rotational direction 502.

As shown in FIG. 5, the first door 410 pivots about a first axis in the first rotational direction 500, and the second door 412 pivots about a second axis in the second rotational direction 502. Notably, the first and second axes about which the first and second doors 410 and 412 pivot are substantially parallel with the direction in which the media units are stacked in the cavity 400. Put another way, the first and second axes about which the first and second doors 410 and 412, respectively, pivot are substantially parallel with the example normal 212 of FIG. 2. Put yet another way, the first and second axes associated about which the first and second doors 410 and 412, respectively, pivot are substantially aligned with the direction in which the media units are stacked in the cavity 400. Put yet another way, the first and second axes intersect the media unit plane when the corresponding media unit is located in the cavity 400.

Figure 6:
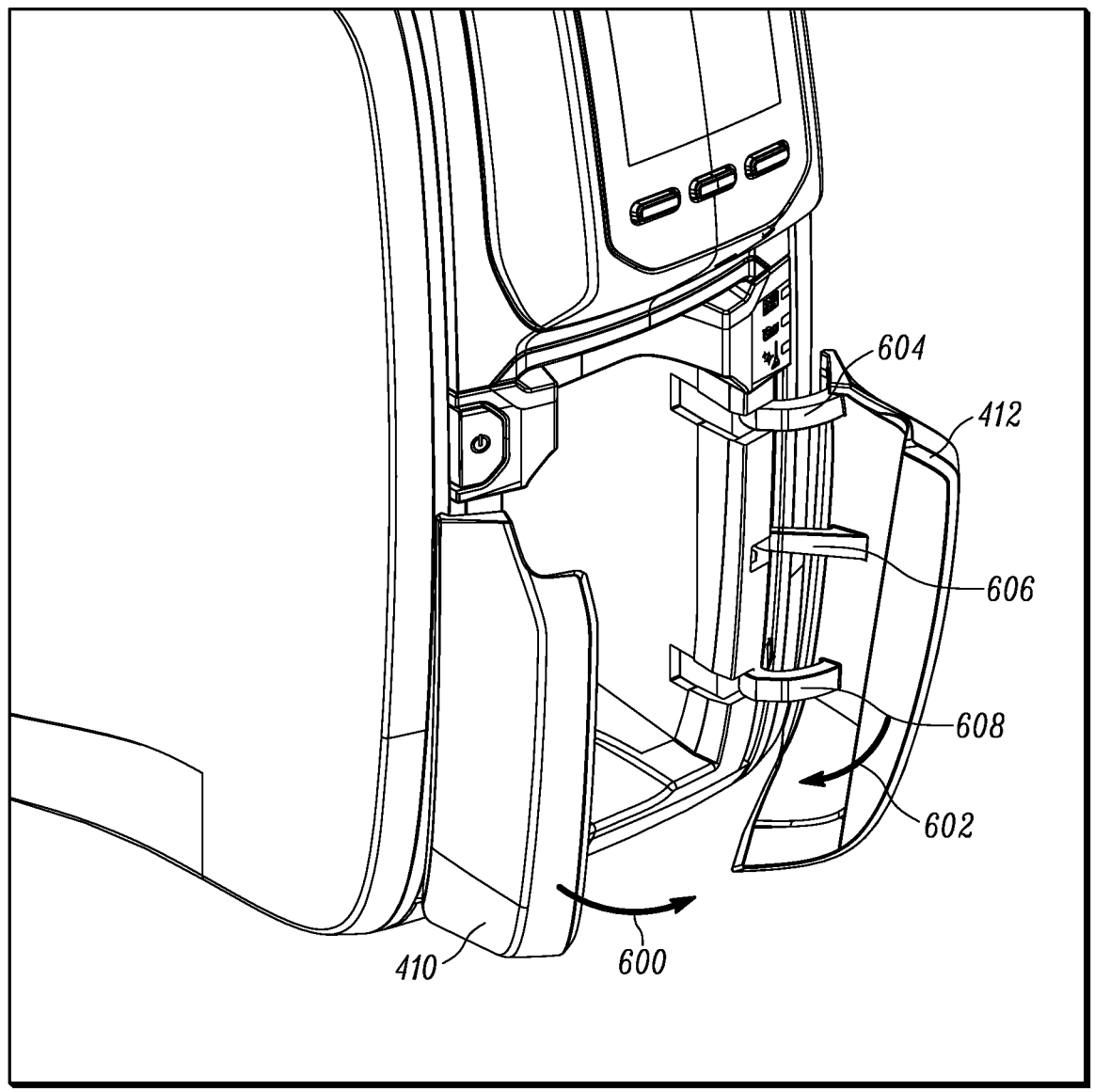
FIG. 6 depict the output hopper in an open position.

FIG. 6 illustrates the first and second doors 410 and 412 in the open position. As the first door 410 moves in the first rotational direction 500 (FIG. 5) and/or the second door 412 moves in the second rotational direction 502 (FIG. 5), the channel between the first and second doors 410 and 412 increases in size. That is, the space between the first and second retaining portions 416 and 418 increases as one and/or both of the first and second doors 410 and 412 move to the open position. The first and second doors 410 and 412 are configured to enlarge the channel, by pivoting in the first and second rotational directions 500 and 502, to a size large enough to permit media unit(s) located in the cavity 400 to exit the output hopper 116 through the channel. Example removals of media unit(s) from the cavity are discussed below in connection with FIGS. 7-9.

When the force that caused the first and second doors 410 and 412 to move the open position is removed (or lessened to a degree that does not overcome the biasing to the closed position), the first and second doors 410 and 412 return to the closed position due to the biasing of the first and second doors 410 and 412 to the closed position. To return to the closed position, the first door 410 moves in a third rotational direction 600 (FIG. 6) opposite the first rotational direction 500, and the second door 412 moves in a fourth rotational direction 602 (FIG. 6) opposite the second rotational direction 502.

As shown in FIG. 6, the second door 412 is pivotably mounted to the housing 104 by first, second, and third mounting arms 604-608. In the illustrated example, the first and third arms 604 and 608 are coupled to mounting elements of the housing 104 (e.g., via a post of the housing 104 being received by an aperture on the arm). In the illustrated example, the second arm 606 is a biasing element that biases the second door 412 to the closed position. In the illustrated example, the second arm 606 is a flexural beam that acts against the frame to spring the door 412 shut. Any suitable type of biasing element(s) can be used to bias the second door 412 to the closed position. Although not visible in FIG. 6, the first door 410 is pivotably mounted to the housing 104 and biased to the closed position in a similar manner as the second door 412.

Figure 7:
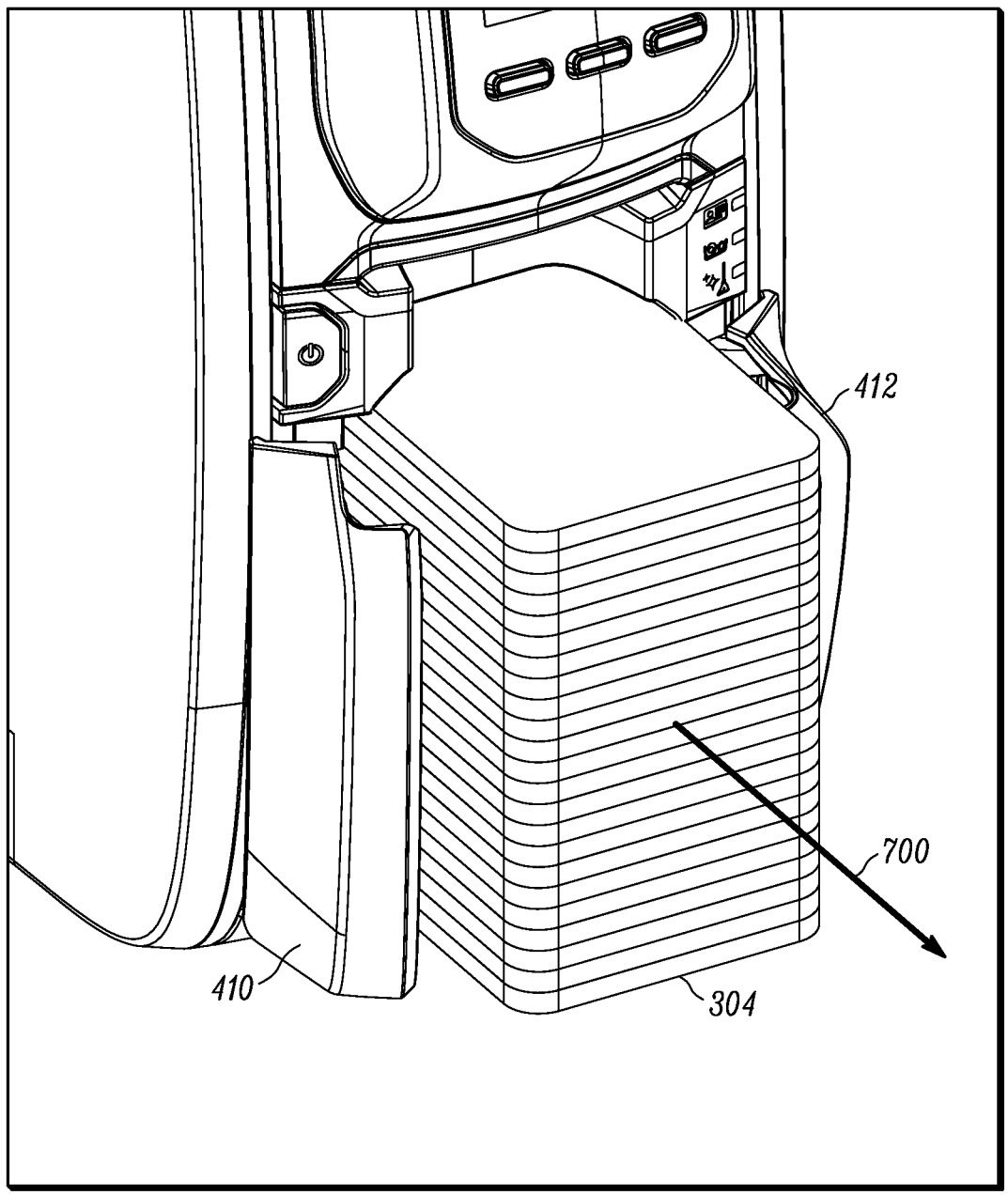
FIG. 7 depicts an example manner of removing a stack of media units from the output hopper.
Figure 8:
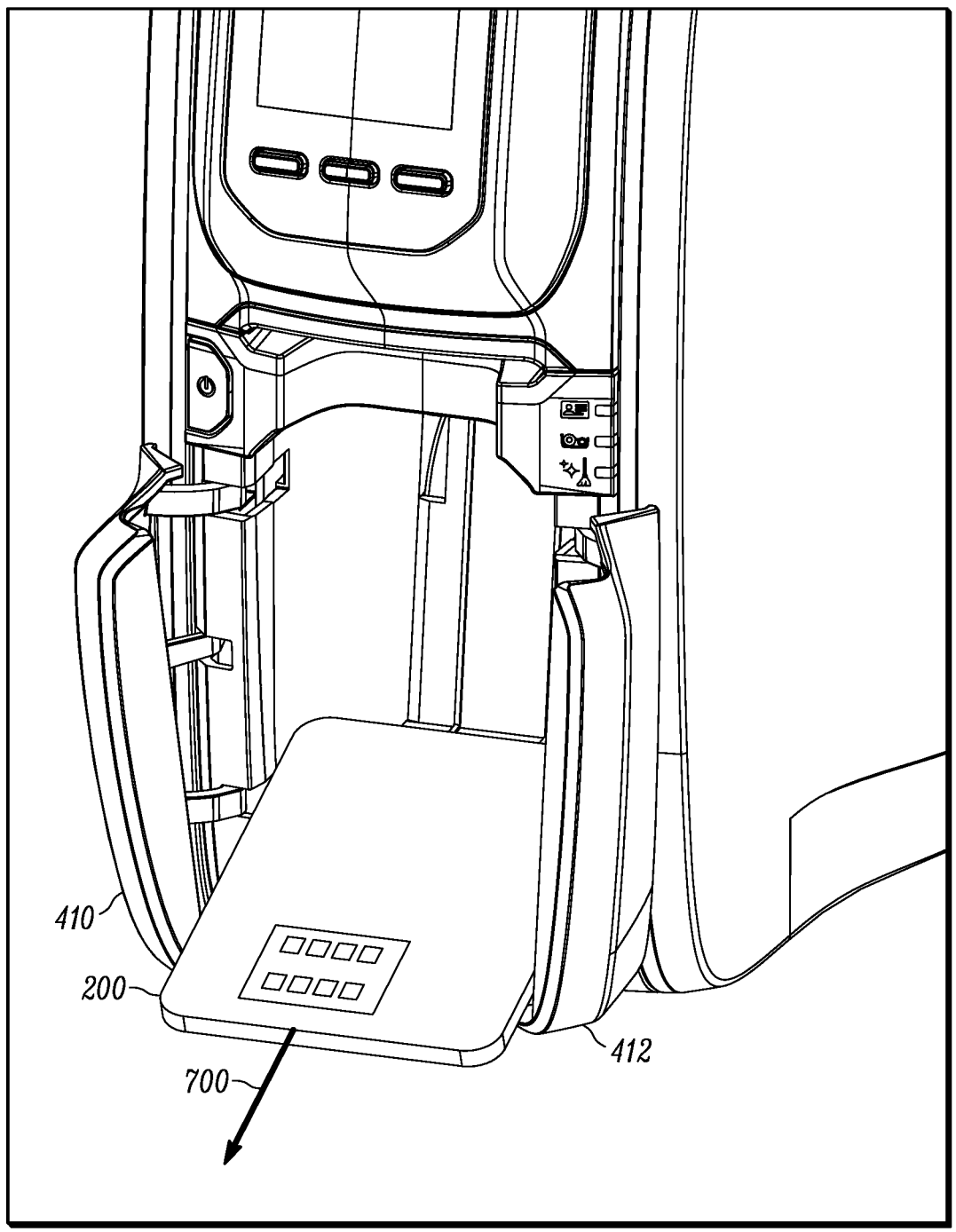
FIG. 8 depicts an example manner of removing a media unit from the output hopper.
Figure 9:
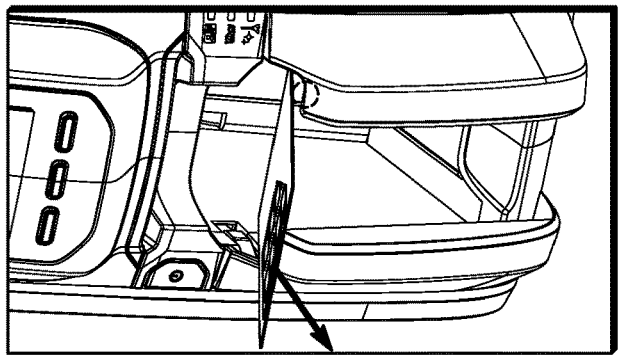
FIG. 9 depicts another example manner of removing a media unit from the output hopper.
Figure 9:
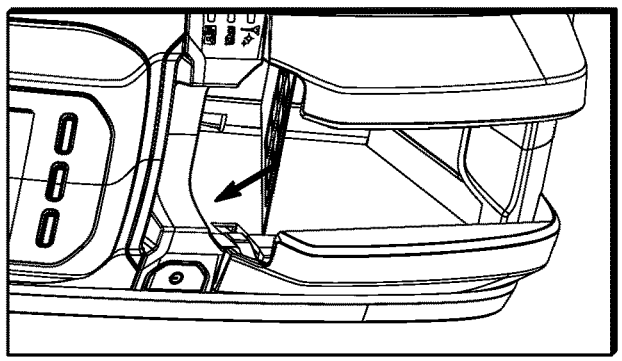
Figure 9:
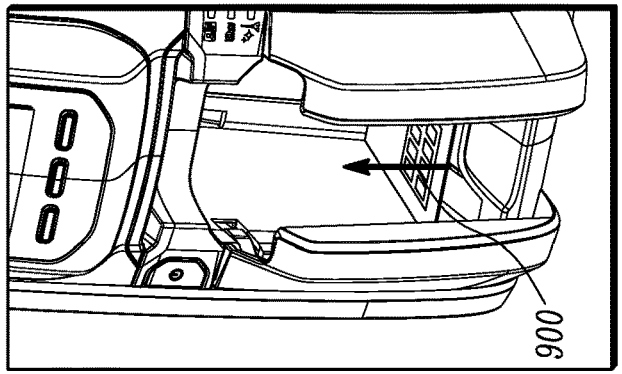
Figure 9:
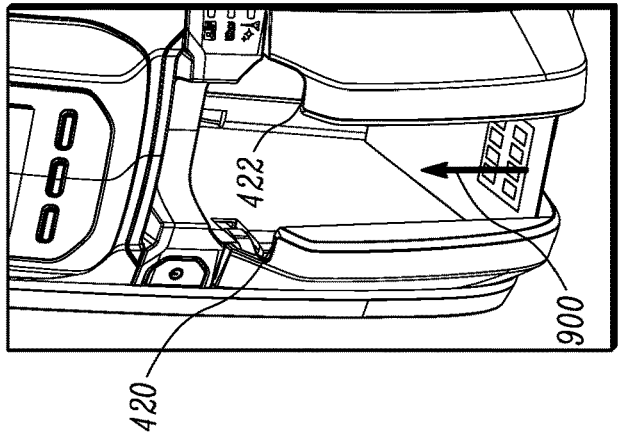

FIGS. 7-9 illustrate example manners in which media unit(s) can be removed from the output hopper 116. In FIG. 7, a stack of media units (e.g., the stack 304 of FIG. 3) has formed in the cavity 400. The stack 304 is removed in FIG. 7 by gripping, for example, a top of the stack 304 and a bottom of the stack 304, and pulling in an exit direction 700 away from the rear surface 402 of the output hopper 116. To grip the stack 304, the user has access to a surface of the bottommost media unit via the recess 414 in the bottom surface 408. The recess 414 forms a forward portion of the bottom surface 408 and provides a gap by dipping down relative to a rearward portion of the bottom surface 408. As the user pulls the stack 304 in the exit direction 700, the stack 304 forces the first and second doors 410 and 412 open to the open position by applying a force to the first and second retaining portions 416 and 418. When the stack 304 is removed (i.e., the second minor surface 204 has traveled in the exit direction 700 passed the first and second retaining portions 416 and 418), the first and second doors 410 and 412 return to the closed position.

In FIG. 8, a single media unit 200 is removed from the cavity 400 in a similar manner as the stack 304 of FIG. 7. The single media unit 200 is gripped by a user and pulled in the exit direction 700 such that the first and second doors 410 and 412 are forced to move from the closed position to the open position. When the media unit 200 clears the first and second retaining portions 416 and 418, the first and second doors 410 and 412 return to the closed position.

In FIG. 9, rather than pulling on the single media unit 200 to force the first and second doors 410 and 412 open, the media unit 200 is lifted in an upward direction 900 until the media unit is over the first and second cutouts 420 and 422. Once the media unit 200 is over the first and second cutouts 420 and 422, the media unit 200 is pulled away from and out of the cavity 400 over the first and second doors 410 and 412.

Figure 10:
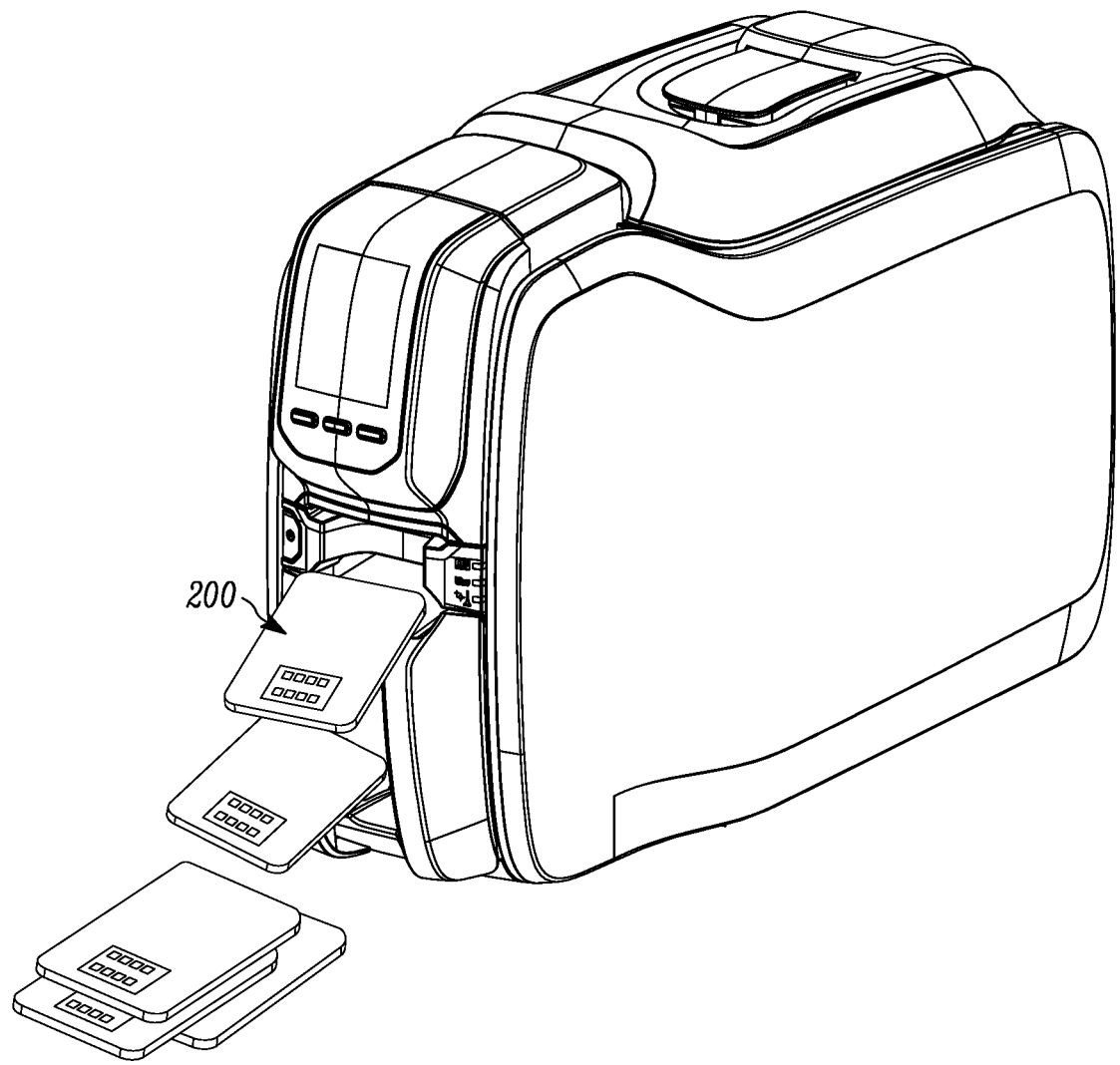
FIG. 10 depicts an overflow of media units.

FIG. 10 illustrates an example overflow protection feature of the example media processing device 100. The first and second doors 410 and 412, including the first and second cutouts 420 and 422, are configured to allow media units 200 dispensed into the output hopper 116 to escape over the first and second doors 410 and 412 should the stack 304 in the cavity 400 become too large. Rather than being completely encased, the cavity 400 is provided with an outlet via the first and second cutouts 420 and 422 so that media units may spill out of the output hopper 116 should, for example, a user fail to empty the output hopper 116 before instructing the media processing 100 to process one or more media units that would exceed the capacity of the output hopper 116. By spilling out of the output hopper 116, the media units do not, for example, jam the media processing device 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

What is claimed is:

1. An output hopper comprising:
   a cavity to receive media units from an output of a media processing device, the cavity to cause the media units to form a stack in a first direction;
   a first door pivotably movable between a closed position and an open position, the first door to retain the media units in the cavity when in the closed position;

a second door movable between the closed position and the open position, the second door to retain the media units in the cavity when in the closed position; and a gap between the first door and the second door, wherein:
the media units are configured to be reached through the gap with both of the first and second doors full closed;
removal of the media units through the gap with both of the first and second doors fully closed causes both of the first and second doors to be moved from the closed positions of the first and second doors to the open positions of the first and second doors via contact with the media units;
the first door is configured to pivot on a first axis substantially parallel to the first direction;
the second door is configured to pivot on a second axis substantially parallel to the first direction;
the first door is biased toward the closed position; and
the second door is biased toward the closed position.

2. The output hopper of claim 1, wherein the first direction extends away from a bottom surface of the output hopper.

3. The output hopper of claim 2, wherein the cavity is configured such that the media units rest on the bottom surface.

4. The output hopper of claim 2, wherein the bottom surface of the output hopper includes a recess configured to provide space between the bottom surface and a surface of a bottommost one of the media units.

5. The output hopper of claim 1, wherein:
the first door is pivotably mounted on a first side of the output hopper; and
the second door is pivotably mounted on a second side of the output hopper, the first side opposing the second side.

6. The output hopper of claim 1, wherein:
the first door is to pivot from the closed position to the open position in a first rotational direction; and
the second door is to pivot from the closed position to the open position in a second rotational direction different than the first rotational direction.

7. The output hopper of claim 1, wherein, when the first and second doors are in the closed position, a first retaining portion of the first door is spaced apart from a second retaining portion of the second door by a first distance.

8. The output hopper of claim 7, wherein, when the first and second doors are in the open position, the first retaining portion is spaced apart from the second retaining portion by a second distance greater than the first distance.

9. The output hopper of claim 7, wherein the first retaining portion is configured to engage a minor edge of the media units when in the closed position.

10. The output hopper of claim 1, wherein:
the first door includes a first cutout at a first top edge of the first door;
the second door includes a second cutout at a second top edge of the second door; and
the first and second cutouts allow the media units to spill over the first and second top edges when a capacity of the cavity is exceeded.

11. The output hopper of claim 1, wherein the first axis intersects a media unit plane defined by a surface of one of the media units.

12. A media processing device comprising:
a media unit transport assembly configured to guide a processed media unit to a media unit output; and
an output hopper to receive the processed media unit, the output hopper comprising:
a first door pivotably mounted to a housing of the media processing device, the first door including a first retaining portion to retain the processed media unit in the output hopper via contact between the first retaining portion and the processed media unit;
a second door pivotably mounted to the housing of the media processing device, the second door including a second retaining portion to retain the processed media unit in the output hopper via contact between the second retaining portion and the processed media unit, wherein:
the first retaining portion is spaced apart from the second retaining portion by a first gap of a first distance when the first and second doors are in a closed position, the first gap to provide access to the processed media unit; and
the first retaining portion is spaced apart from the second retaining portion by a second gap of a second distance greater than the first distance when the first door is in an open position.

13. The media processing device of claim 12, wherein:
the first distance is less than a length of an edge of the processed media unit; and
the second distance is greater than the length of the edge of the processed media unit.

14. The media processing device of claim 12, further comprising a printhead to generate indicia on a media unit.

15. The media processing device of claim 12, wherein the first door is moved to the open position in a first rotational direction about a first axis.

16. The media processing device of claim 15, wherein the first axis is substantially parallel to a direction in which media units are stacked in a cavity of the output hopper.

17. The media processing device of claim 15, wherein the first axis intersects a media unit plane defined by a surface of the processed media unit.

18. The media processing device of claim 12, wherein the output hopper is configured to allow processed media units to exit the output hopper when a capacity of the output hopper is exceeded.

19. The media processing device of claim 12, wherein the first gap provides access to the processed media unit by enabling a user to reach into a cavity in which the processed media unit is located with the first and second doors in the closed position.

\* \* \* \* \*